United States Patent
Campbell et al.

(10) Patent No.: US 9,014,005 B2
(45) Date of Patent: Apr. 21, 2015

(54) LOW-LATENCY LOSSLESS SWITCH FABRIC FOR USE IN A DATA CENTER

(71) Applicant: Lenovo Enterprise Solutions (Singapore) Pte. Ltd., Singapore (SG)

(72) Inventors: Alexander P. Campbell, Kanata (CA); Keshav G. Kamble, Fremont, CA (US); Vijoy A. Pandey, San Jose, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 54 days.

(21) Appl. No.: 13/741,346

(22) Filed: Jan. 14, 2013

(65) Prior Publication Data

US 2014/0198638 A1    Jul. 17, 2014

(51) Int. Cl.
*H04L 12/801* (2013.01)
*H04L 12/803* (2013.01)

(52) U.S. Cl.
CPC .............. H04L 47/12 (2013.01); H04L 47/122 (2013.01)

(58) Field of Classification Search
USPC ........... 370/230, 230.1, 231–234, 235, 235.1, 370/236, 236.1, 236.2, 237, 238, 238.1, 370/395.2, 395.21
See application file for complete search history.

(56) References Cited

U.S. PATENT DOCUMENTS

| | | | |
|---|---|---|---|
| 6,925,257 B2 | 8/2005 | Yoo | |
| 7,729,259 B1 | 6/2010 | Faulkner et al. | |
| 8,554,943 B1 * | 10/2013 | Walton et al. | 709/232 |
| 2005/0147032 A1 | 7/2005 | Lyon et al. | |
| 2008/0138067 A1 | 6/2008 | Beshai | |
| 2008/0259798 A1 * | 10/2008 | Loh et al. | 370/235 |
| 2009/0300209 A1 * | 12/2009 | Elzur | 709/234 |
| 2010/0316049 A1 | 12/2010 | Diab | |

FOREIGN PATENT DOCUMENTS

| | | |
|---|---|---|
| CN | 1863198 | 11/2006 |
| CN | 101605102 | 12/2009 |
| CN | 102355421 | 2/2012 |
| JP | 2000-244506 A | 9/2000 |

OTHER PUBLICATIONS

International Search Report and Written Opinion from PCT Application No. PCT/IB2013/060799 dated May 8, 2014.

* cited by examiner

*Primary Examiner* — Hoon J Chung (74) *Attorney, Agent, or Firm* — Zilka-Kotab, PC (57) ABSTRACT

In one embodiment, a system includes a switch configured for communicating with a low-latency switch and a buffered switch, the switch having a processor adapted for executing logic, logic adapted for receiving a packet at an ingress port of a switch, logic adapted for receiving congestion information, logic adapted for determining that at least one congestion condition is net based on at least the congestion information, logic adapted for applying a packet forwarding policy to the packet when the at least one congestion condition is met, logic adapted for forwarding the packet to a buffered switch when the packet satisfies the packet forwarding policy, and logic adapted for forwarding the packet to a low-latency switch when the at least one congestion condition is not met.

22 Claims, 6 Drawing Sheets

LOW-LATENCY LOSSLESS SWITCH FABRIC FOR USE IN A DATA CENTER

BACKGROUND

The present invention relates to data center infrastructure, and more particularly, this invention relates to utilizing a low-latency lossless switch fabric in a data center.

Low latency is a highly desirable feature for data center switch fabric. For example, in high-frequency transactions, low latency allows applications to execute large volumes of orders, such as automated stock trades, etc., at fractions of a second. Similarly, in real-time communications, such as video feeds, telemetry, etc., delays in processing information may be detrimental to user experience or efficient control of devices relying on the video feeds and/or telemetry.

An important problem for low latency switch fabric implementations is that they do not provide deep buffering, and hence packets are lost when the fabric is congested. That is, a switch is not capable of forwarding a packet due to congestion conditions and the switch drops one or more packets, which causes a failure or significant delay of the transaction.

Existing solutions for lossless switches involve internal packet buffering. A buffered switch is configured to send all packets through a memory buffer to avoid packet loss. Unfortunately, this solution causes increases in latency because moving a packet into and then out of memory takes time, thus increasing latency for the solution. Accordingly, a better solution would be beneficial to provide a low-latency lossless switch fabric in a data center.

SUMMARY

In one embodiment, a system includes a switch configured for communicating with a low-latency switch and a buffered switch, the switch having a processor adapted for executing logic, logic adapted for receiving a packet at an ingress port of a switch, logic adapted for receiving congestion information, logic adapted for determining that at least one congestion condition is met based on at least the congestion information, logic adapted for applying a packet forwarding policy to the packet when the at least one congestion condition is met, logic adapted for forwarding the packet to a buffered switch when the packet satisfies the packet forwarding policy, and logic adapted for forwarding the packet to a low-latency switch when the at least one congestion condition is not met.

In another embodiment, a computer program product for providing low latency packet forwarding with guaranteed delivery includes a computer readable storage medium having computer readable program code embodied therewith, the computer readable program code including computer readable program code configured for receiving a packet at an ingress port of a switch, computer readable program code configured for determining that at least one congestion condition is met, computer readable program code configured for applying a packet forwarding policy to the packet when the at least one congestion condition is met, computer readable program code configured for forwarding the packet to a buffered switch when the packet satisfies the packet forwarding policy, and computer readable program code configured for forwarding the packet to a low-latency switch when the at least one congestion condition is not met.

In yet another embodiment, a method for providing low latency packet forwarding with guaranteed delivery includes receiving a packet at an ingress port of a switch, determining that at least one congestion condition is met, applying a packet forwarding policy to the packet when the at least one congestion condition is met, forwarding the packet to a buffered switch when the packet satisfies the packet forwarding policy, and forwarding the packet to a low-latency switch when the at least one congestion condition is not met.

According to another embodiment, a method for providing low latency packet forwarding with guaranteed delivery includes receiving a packet at an ingress port of a switch, receiving congestion information from one or more downstream switches, determining that at least one congestion condition is met based on at least the congestion information, processing the packet to determine at least one property of the packet, applying a packet forwarding policy to the packet when the at least one congestion condition is met, wherein the at least one property of the packet is used to determine if the packet satisfies the packet forwarding policy, forwarding the packet to a buffered switch when the packet satisfies the packet forwarding policy, and forwarding the packet to a low-latency switch when the at least one congestion condition is not met.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to various embodiments described herein, a data center fabric may be configured with a combination of low-latency and buffered switches. The low-latency switches may be provided with switching processors which have additional policy tables provided with forwarding decisions based on congestion of the fabric, which may be provided to the low-latency switches using a feedback mechanism. Depending on congestion conditions in the fabric, a forwarding switch may send packets either to a low-latency or a buffered switch. Further, according to one embodiment, in order to determine which type of switch to forward the packet or to drop the packet, the forwarding switch may apply packet-forwarding policies.

One advantage of this procedure is that the fabric configuration provides the best of both worlds: it has low latency and it enables lossless communications even while the fabric is congested. Another advantage is that the fabric may be easily configured to adapt to a wide variety of data center conditions and data applications.

In one general embodiment, a system includes a switch configured for communicating with a low-latency switch and a buffered switch, the switch having a processor adapted for executing logic, logic adapted for receiving a packet at an ingress port of a switch, logic adapted for receiving congestion information, logic adapted for determining that at least one congestion condition is met based on at least the congestion information, logic adapted for applying a packet forwarding policy to the packet when the at least one congestion condition is met, logic adapted for forwarding the packet to a buffered switch when the packet satisfies the packet forwarding policy, and logic adapted for forwarding the packet to a low-latency switch when the at least one congestion condition is not met.

In another general embodiment, a computer program product for providing low latency packet forwarding with guaranteed delivery includes a computer readable storage medium having computer readable program code embodied therewith, the computer readable program code including computer readable program code configured for receiving a packet at an ingress port of a switch, computer readable program code configured for determining that at least one congestion condition is met, computer readable program code configured for applying a packet forwarding policy to the packet when the at least one congestion condition is met, computer readable program code configured for forwarding, the packet to a buffered switch when the packet satisfies the packet forwarding policy, and computer readable program code configured for forwarding the packet to a low-latency switch when the at least one congestion condition is not met.

In yet another general embodiment, a method for providing low latency packet forwarding with guaranteed delivery includes receiving a packet at an ingress port of a switch, determining that at least one congestion condition is met, applying a packet forwarding policy to the packet when the at least one congestion condition is met, forwarding the packet to a buffered switch when the packet satisfies the packet forwarding policy, and forwarding the packet to a low-latency switch when the at least one congestion condition is not met.

According to another general embodiment, a method for providing low latency packet forwarding with guaranteed delivery includes receiving a packet at an ingress port of a switch, receiving congestion information from one or more downstream switches, determining that at least one congestion condition is met based on at least the congestion information, processing the packet to determine at least one property of the packet, applying a packet forwarding policy to the packet when the at least one congestion condition is met, wherein the at least one property of the packet is used to determine if the packet satisfies the packet forwarding policy, forwarding the packet to a buffered switch when the packet satisfies the packet forwarding policy, and forwarding the packet to a low-latency switch when the at least one congestion condition is not met.

As will be appreciated by one skilled in the art, aspects of the present invention may be embodied as a system, method or computer program product. Accordingly, aspects of the present invention may take the form of an entirely hardware embodiment, entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a on-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention.

It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
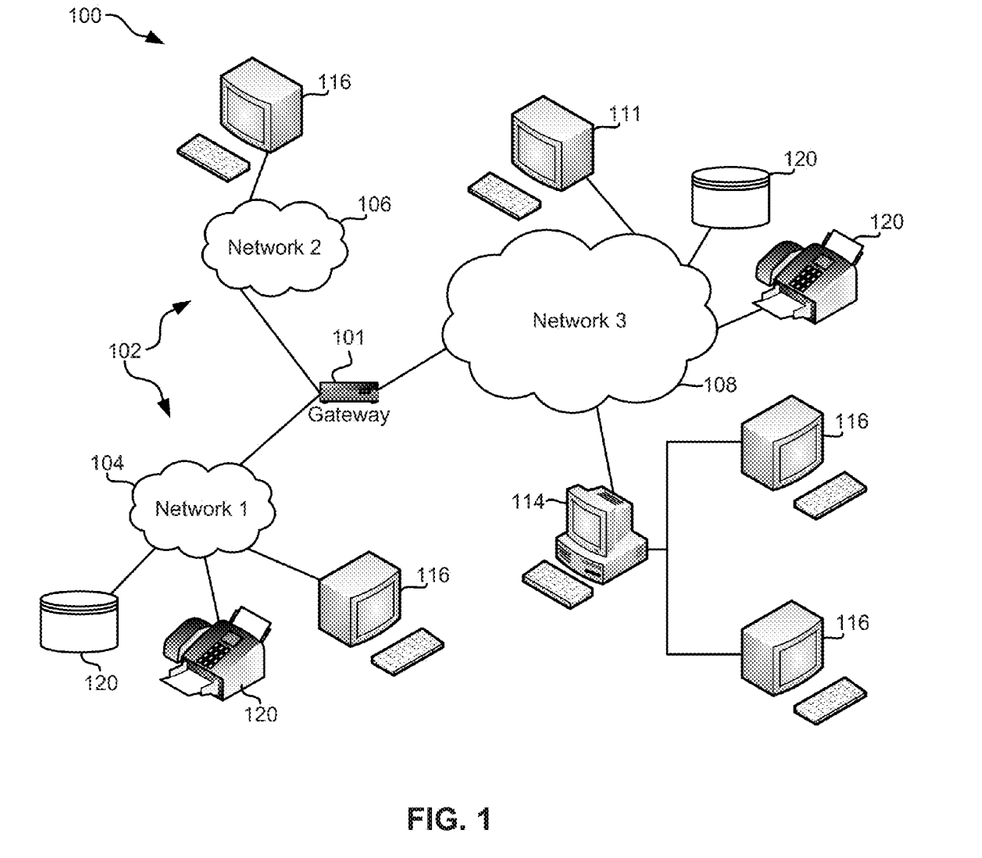
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
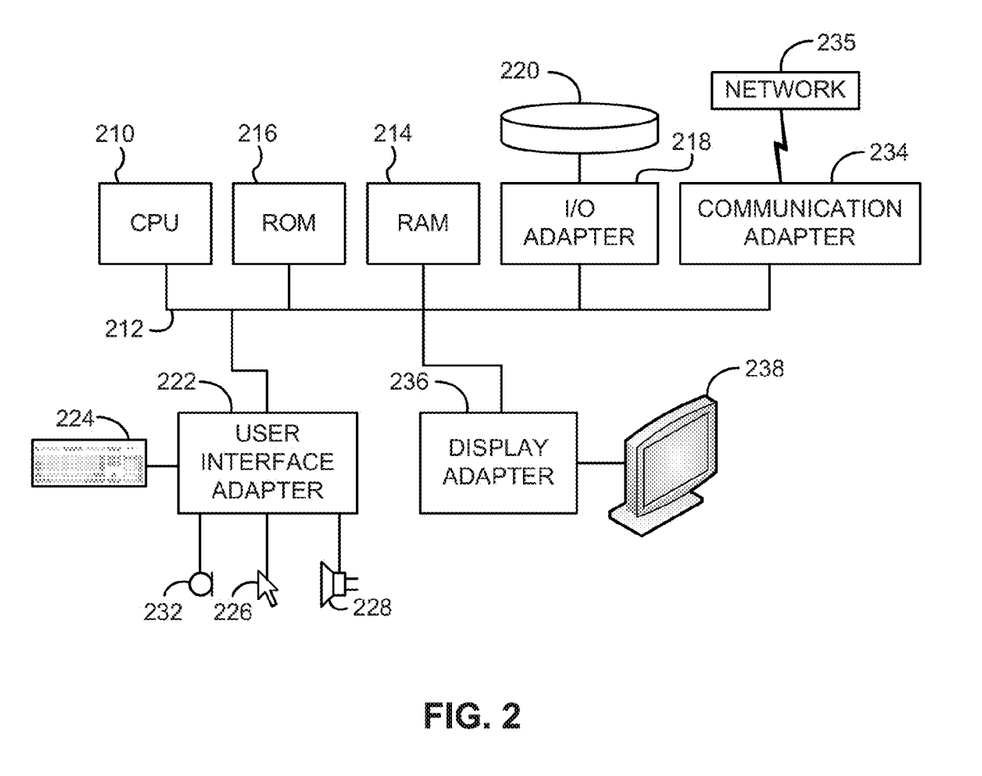
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 21 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
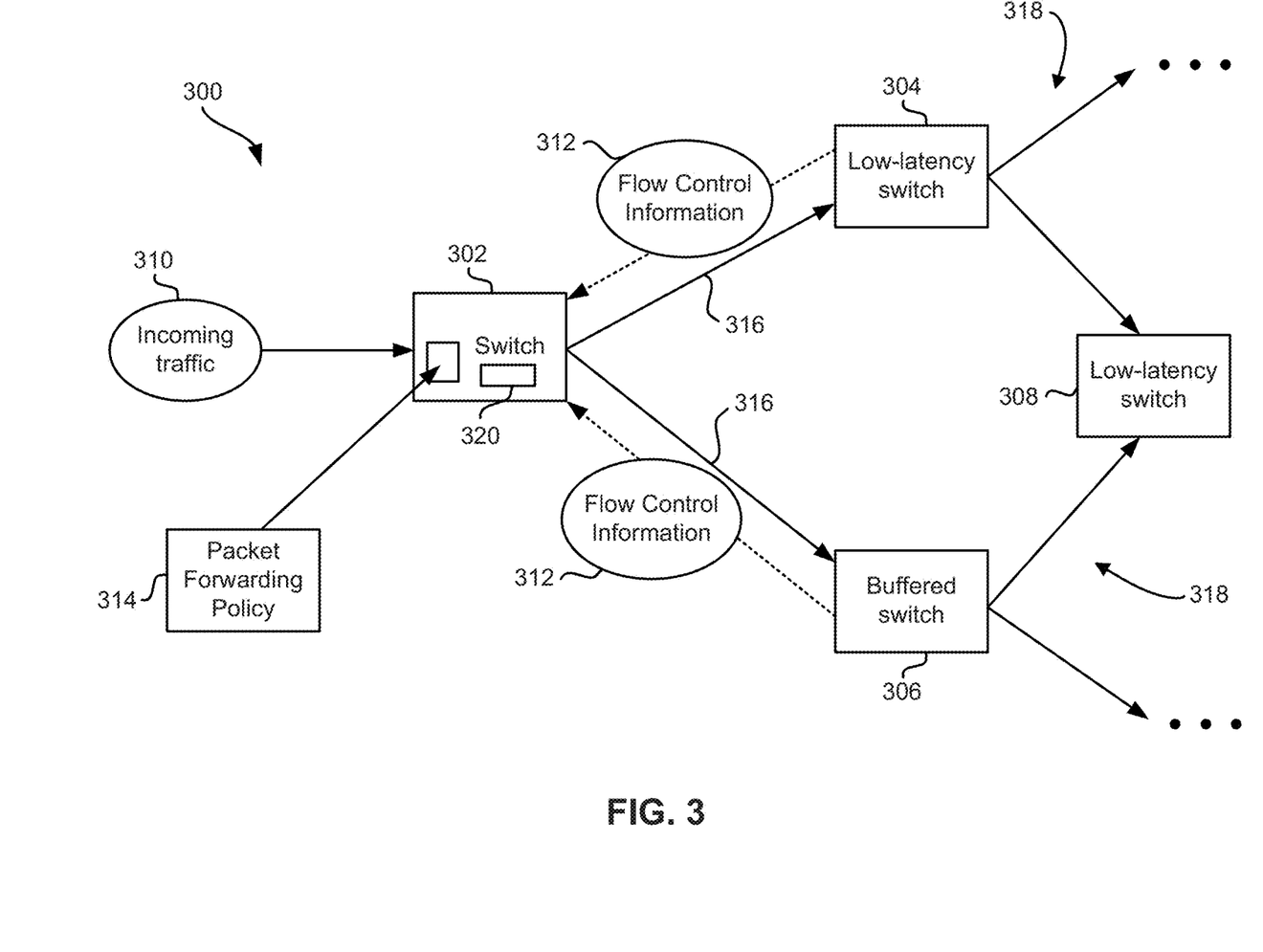
FIG. 3 is a simplified diagram of a low-latency lossless switch fabric configuration within a data center, according to one embodiment.

Now referring to FIG. 3, a low-latency lossless switch fabric configuration 300 within a data center is shown according to one embodiment. The switch fabric configuration 300 comprises a data center fabric 318 and various switches. Switch 302 is adapted for receiving incoming traffic 310. The incoming traffic 310 may be received from any source, such as another switch, a router, a traffic source (like a communications device, a mainframe, a server, etc.). The switch 302 is adapted for forwarding the received traffic 310 (as data payload packets 316) to either low-latency switch 304 or buffered switch 306. Switches 304 and 306 are adapted for forwarding the data payload packets 316 to a second low-latency switch 308. All switches may be implemented as physical switches, virtual switches, or a combination thereof.

For physical switch implementations, each physical switch may include a switching processor 320, such as a field programmable gate array (FPGA), an application specific integrated circuit (ASIC), a microprocessor, a microcontroller, a central processing unit (CPU), or some other processor known in the art.

For virtual switch implementations, a processor of the server supporting the virtual switch may provide the switching functionality, as known in the art.

Referring again to FIG. 3, switch 302 is also adapted for receiving flow control information 312 from switches 304 and 306. The flow control information 312 may be sent/received in any suitable format, such as control packets, priority-based flow control (PFC), enhanced transmission selection (ETS), quantized congestion notification (QCN), Institute of Electrical and Electronics Engineers (IEEE) 802.3x, etc. Depending on the flow control information 312 received, switch 302 determines whether congestion conditions exist in the data center fabric 318. For example, when low-latency switch 304 is congested, switch 302, instead of dropping one or more packets, forwards the one or more packets to buffered switch 306. Buffered switch 306 is also enabled to evaluate congestion conditions on the data center fabric 318 and, depending on the conditions, is adapted for forwarding the packet(s) to the second low-latency switch 308. As a result, the data center fabric 318 is adapted for selecting a path of least latency available at any given time.

According to various embodiments, switch 302 has access to packet forwarding policy 314. In one approach, a physical switch may include the packet forwarding policy. In an alternative approach, a server hosting a virtual switch may comprise the packet forwarding policy. The packet forwarding policy 314 comprises criteria for forwarding packets in congestion conditions along with one or more alternative ports.

For example, the criteria may include packet priority, a destination identifier, e.g., an IP address, a media access control (MAC) address, etc., a traffic flow identifier, e.g., a combination of source and destination addresses, a packet size, a packet latency, virtual local area network (VLAN) tag(s), and/or other related parameters. The alternative port may be a physical port, logical interface, Link Aggregation (LAG) group, virtual port, etc.

In other words, one or more properties of the packet may be determined and used in the packet forwarding policy to determine if the packet satisfies the packet forwarding policy. The property of the packet may include any of the following: a packet priority, a destination application identifier, a source address, a destination address, a packet size, a VLAN identifier, and/or an acceptable latency for the packet.

Figure 4:
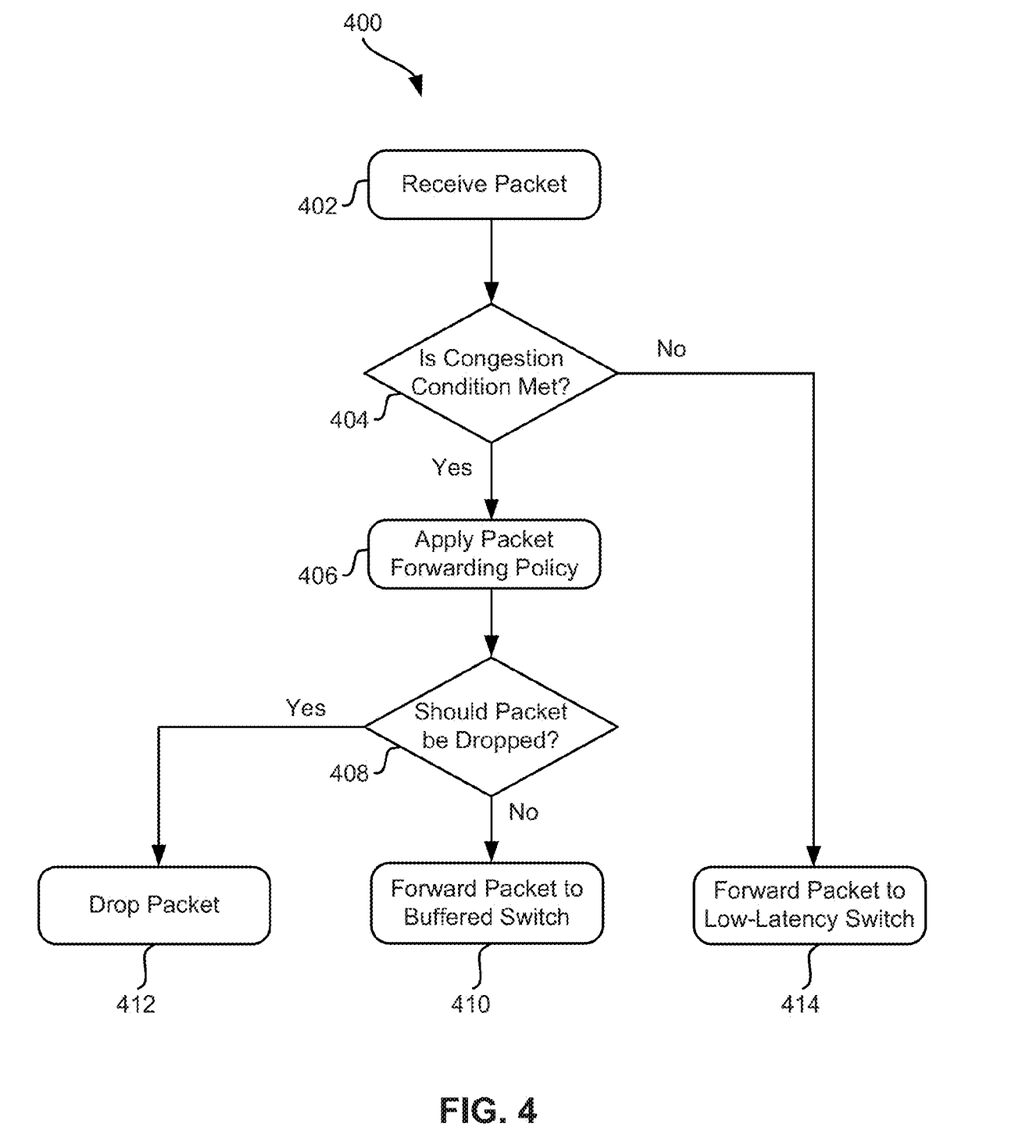
FIG. 4 is a flowchart of a method, according to one embodiment.

Now referring to FIG. 4, a simplified flow chart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in one embodiment, the method 400 may be partially or entirely performed by a switch in a data center fabric. Particularly, method 400 may be partially or entirely performed by a processor of a switch, with access to packet forwarding policy.

First, as shown in operation 402, a packet of incoming traffic is received (such as at a switch in the data center fabric). In operation 404, it is determined if at least one congestion condition is met. This determination may be made by a processor of a switch, in one embodiment, such as an ASIC, a microcontroller, a FPGA, etc.

In one embodiment, the at least one fabric congestion criteria may include receipt of back pressure from one or more low-latency switches downstream of the switch. In this way, if a low-latency switch is indicating congestion, traffic may be diverted from this switch until it is able to process the traffic it has already been forwarded.

According to various embodiments, the at least one congestion condition may be binary (Yes/No), multi-step, tiered, etc. That is, a multi-step condition may include various levels of congestion criteria in the fabric (e.g., high, medium, low). A tiered condition may include categories, each category including one or more forwarding procedures. For example, different types of packets may be categorized and dealt with differently in the forwarding policy. Depending on the level of congestion, a default action may be adjusted to best handle a run-time situation.

If the at least one congestion condition is not met, the packet is forwarded to a low-latency switch in operation 414. This may be a default action in some approaches as it allows traffic to proceed through the data center fabric in a most expedient manner.

If the at least one congestion condition is met, a packet forwarding policy is applied in operation 406 to determine how to forward the packet. Application of the packet forwarding policy in operation 406 involves determining relevant attributes of the packet. For example, if the policy indicates that lossless treatment is to be provided to packets with a certain priority, priority information is extracted from the packet. All other parameters of the packet, either present in the packet or calculated using an algorithm, may be extracted for future comparison and/or for other comparisons or determinations.

The packet forwarding policy may indicate dropping the packet in one or more scenarios, as shown in operation 408. For example, in one approach, if the packet does not satisfy policy criteria, the packet may be dropped, as shown in operation 412.

If the packet satisfies the packet forwarding policy and it is not dropped, the packet is forwarded to a buffered switch in operation 410. The decision whether to drop the packet or forward the packet to the buffered switch may be made based on a calculated fit between a value extracted in operation 406 and a specification in the packet forwarding policy, according to one embodiment.

Standard flow control protocols which may trigger this mechanism include 802.1Qbb—Priority Based Flow Control (PFC), 802.1az—Enhanced Transmission Selection (ETS), Quantized Congestion Notification (QCN), or any other regular flow control according to IEEE 802.3X.

In more embodiments, referring again to FIG. 4, any or all operations of method 400 may be implemented in a system or a computer program product.

Figure 5:
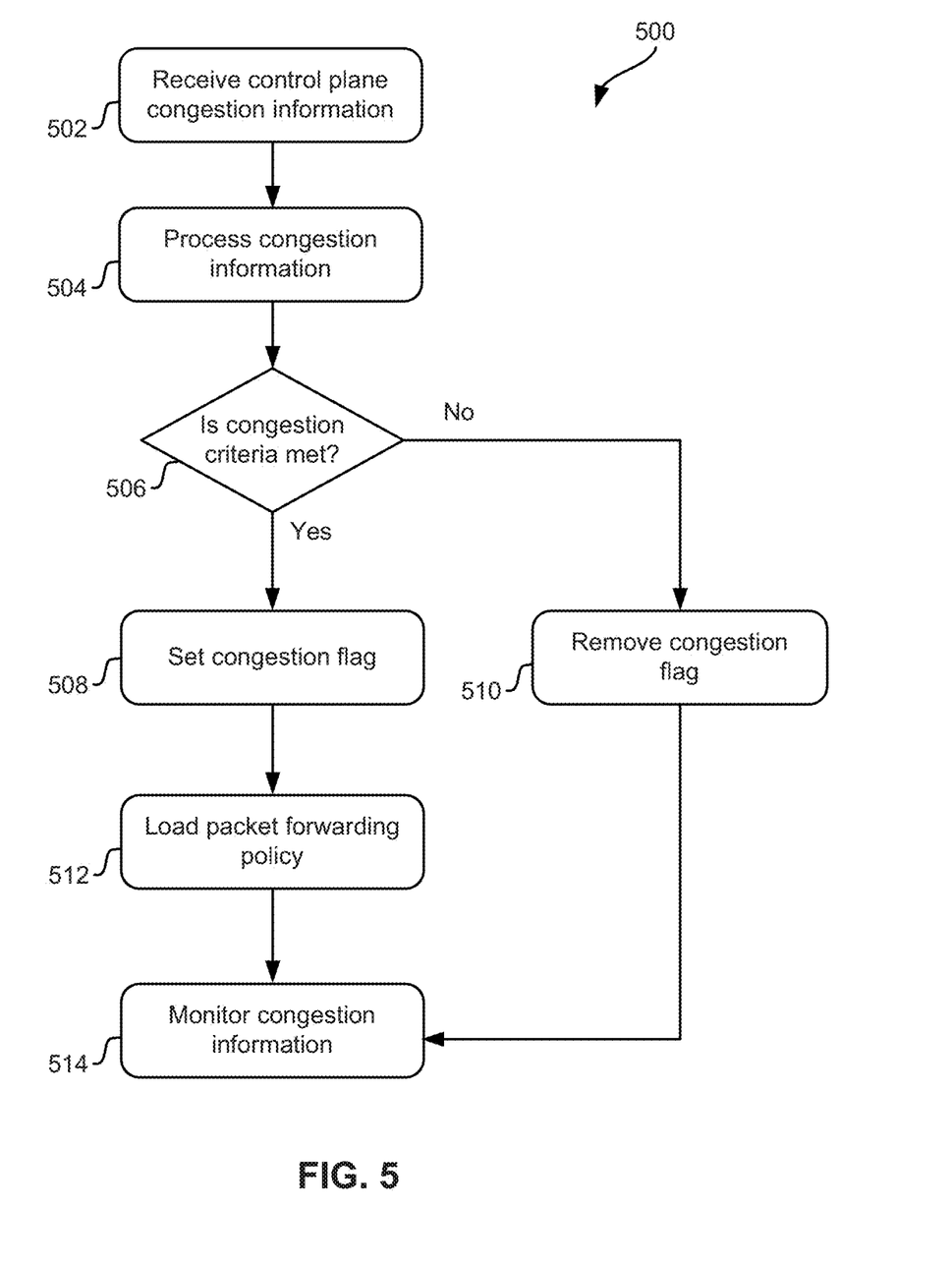
FIG. 5 is a flowchart of a method, according to another embodiment.

FIG. 5 shows a simplified flow chart of control logic that may be used in conjunction with operation 404 of method 400 shown in FIG. 4. Referring again to FIG. 5, the method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a switch in a data center fabric.

Particularly, method 500 may be partially or entirely performed by a processor of a switch, with access to packet forwarding policy.

In operation 502, control plane congestion information is received. According to one embodiment, a switch may receive this information relevant to the fabric congestion conditions. The information may be sent from switches connected directly to the receiving switch, from a configuration terminal (or some other central repository of congestion information, such as a server), or some other external agent, as would be understood by one of skill in the art upon reading the present descriptions. According to one embodiment, switching ASICs (from various switches in the data center fabric) may derive the congestion or flow control information from standard flow control protocols and may check their transmit queue level thresholds in order to obtain the control plane congestion information to send to the switch.

In operation 504, the congestion information is processed and in operation 506, it is determined whether at least one fabric congestion criteria is met.

In one embodiment, the at least one fabric congestion criteria may include receipt of back pressure from one or more low-latency switches downstream of the switch. In this way, if a low-latency switch is indicating congestion, traffic may be diverted from this switch until it is able to process the traffic it has already been forwarded.

If the at least one criteria is met, a congestion flag is set in operation 508 and a packet forwarding policy is loaded in operation 512. After the packet forwarding policy is loaded, congestion information is continued to be monitored in operation 514. If the at least one congestion criteria is not met, the congestion flag is removed in operation 510 and congestion information is continued to be monitored in operation 514.

The processing of the congestion information in operation 504 may be implemented in a distributed manner. For example, processing of congestion information may be performed on an external device, a software entity, or some other processing facility capable of processing the congestion information. In this case, the external entity may communicate only the required portions of the congestion information to the switch.

Further, the switch may be configured to modify the congestion criteria or upload policies dynamically, depending on its internal state and available resources.

FIG. 5 shows a binary implementation of the congestion logic. That is, congestion is determined as a Yes or No condition. An alternative implementation may provide for multi-level congestion logic and/or tiered congestion logic, as described previously. Further, depending on the level of congestion, a different forwarding policy may be loaded and/or executed at the runtime.

In more embodiments, referring again to FIG. 5, any or all operations of method 500 may be implemented in a system or a computer program product.

Figure 6:
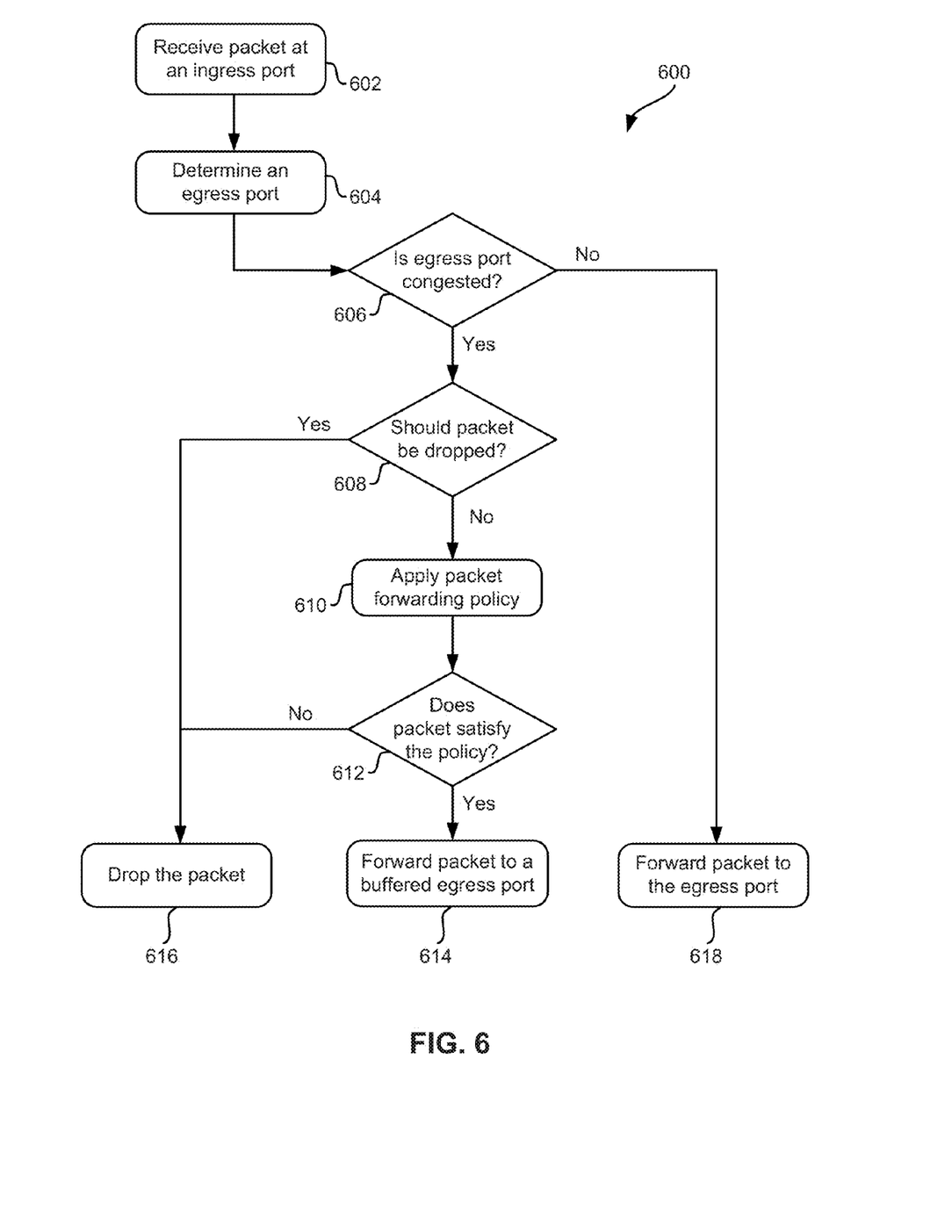
FIG. 6 is a flowchart of a method, according to yet another embodiment.

Now referring to FIG. 6, a flowchart of a method 600 for providing low latency switching to incoming traffic is shown, according to one embodiment. The method 600 may be performed in accordance with the present invention in any of the environments depicted in FIGS. 1-3, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a switch in a data center fabric. Particularly, method 600 may be partially or entirely performed by a processor of a switch, with access to packet forwarding policy.

As shown in FIG. 6, method 600 may initiate with operation 602, where a packet is received at an ingress port of a switch. In operation 604, the switch determines an egress port, such as by processing the packet and determining a destination address in a header of the packet, according to one embodiment.

In operation 606, the switch determines if the determined egress port is congested. If the egress port is not congested, the packet is forwarded to the egress port for forwarding further along in the fabric.

In one embodiment, it may be determined that the egress port is congested when back pressure is received from one or more low-latency switches downstream of the egress port.

If the egress port is congested, it is further determined if the packet should be dropped in operation 608. In operation 616, the packet is dropped. If it is determined that the packet should not be dropped, in operation 610 the packet forwarding policy is applied. In operation 612, it is determined if the packet satisfies the policy. If not, the packet is dropped in operation 616.

If the packet satisfies the policy, in operation 614, the packet is forwarded to a buffered egress port, in order to account for congestion in the fabric.

In more embodiments, referring again to FIGS. 4-6, any or all operations of methods 400, 500, and/or 600 may be implemented in a system or a computer program product.

For example, in one embodiment, a system may comprise a switch connected to a low-latency switch and a buffered switch. The switch may comprise a processor adapted for executing logic (such as an ASIC), logic adapted for receiving a packet at an ingress port of a switch, logic adapted for receiving congestion information, logic adapted for determining that at least one congestion condition is met based on at least the congestion information, logic adapted for applying a packet forwarding policy to the packet when the at least one congestion condition is met, logic adapted for forwarding the packet to a buffered switch when the packet satisfies the packet forwarding policy, and logic adapted for forwarding the packet to a low-latency switch when the at least one congestion condition is not met.

In another example, a computer program product for providing disjoint multi paths in a network comprises a computer readable storage medium having computer readable program code embodied therewith. The computer readable program code includes computer readable program code configured for receiving a packet at an ingress port of a switch, computer readable program code configured for determining that at least one congestion condition is met, computer readable program code configured for applying a packet forwarding policy to the packet when the at least one congestion condition is met, computer readable program code configured for forwarding the packet to a buffered switch when the packet satisfies the packet forwarding policy, and computer readable program code configured for forwarding the packet to a low-latency switch when the at least one congestion condition is not met.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system comprising:
a switch configured for communicating through a fabric with a low-latency switch and a buffered switch,
wherein the low-latency switch comprises an additional policy table provided with forwarding decisions based on a congestion of the fabric,
wherein the buffered switch is configured to evaluate congestion conditions on the fabric, and
wherein the switch comprises a processor configured to execute logic, the logic being configured to:
receive a packet at an ingress port of the switch;
receive congestion information;
determine that at least one congestion condition is met based on at least the congestion information;
apply a packet forwarding policy to the packet when the at least one congestion condition is met;
forward the packet to the buffered switch when the packet satisfies the packet forwarding policy; and
forward the packet to the low-latency switch when the at least one congestion condition is not met.

2. The system as recited in claim 1, wherein the logic is further configured to:
determine if the packet forwarding policy indicates to drop the packet; and
drop the packet when the packet forwarding policy indicates to drop the packet.

3. The system as recited in claim 1, wherein the at least one congestion condition comprises receipt of back pressure from one or more low-latency switches downstream of the switch, and wherein the logic is further configured to divert traffic from any low-latency switch indicating congestion until the low-latency switch is able to process the traffic already forwarded to the low-latency switch.

4. The system as recited in claim 1, wherein the logic is further configured to process the packet to determine at least one property of the packet, the at least one property of the packet comprising one or more of: a packet priority, a destination application identifier, a source address, a destination address, a packet size, a virtual local area network (VLAN) identifier, and an acceptable latency for the packet.

5. The system as recited in claim 4, wherein the logic is further configured to use the at least one property of the packet to determine when the packet satisfies the packet forwarding policy.

6. The system as recited in claim 4, wherein the packet forwarding policy is a multi-stage policy which takes into account the at least one property of the packet and levels of congestion for downstream switches, the multi-stage policy categorizing packets and forwarding the packets to downstream switches based on the level of congestion of the downstream switches and the categorization of the packets.

7. A computer program product for providing low latency packet forwarding with guaranteed delivery, the computer program product comprising a non-transitory computer readable storage medium having computer readable program code embodied therewith, the computer readable program code comprising:
computer readable program code configured for communicating through a fabric, using a switch, with a low-latency switch and a buffered switch;
computer readable program code configured for receiving a packet at an ingress port of the switch;
computer readable program code configured for receiving, at the switch, congestion information from one or more downstream low-latency switches;
computer readable program code configured for determining that at least one congestion condition is met based on at least the congestion information;
computer readable program code configured for processing the packet to determine at least one property of the packet;
computer readable program code configured for applying a packet forwarding policy to the packet in response to a determination that the at least one congestion condition is met, wherein the at least one property of the packet is used to determine whether the packet satisfies the packet forwarding policy;
computer readable program code configured for forwarding the packet to the buffered switch in response to a determination that the packet satisfies the packet forwarding policy; and
computer readable program code configured for forwarding the packet to the low-latency switch in response to a determination that the at least one congestion condition is not met such that traffic is diverted from any low-latency switch indicating congestion until the low-latency switch is able to process the traffic already forwarded to the low-latency switch.

8. The computer program product as recited in claim 7, further comprising:
computer readable program code configured for determining whether the packet forwarding policy indicates to drop the packet; and
computer readable program code configured for dropping the packet in response to a determination that the packet forwarding policy indicates to drop the packet.

9. The computer program product as recited in claim 7, wherein the at least one congestion condition comprises receipt of back pressure from one or more low-latency switches downstream of the switch, and further comprising computer readable program code configured for diverting traffic from any low-latency switch indicating congestion until the low-latency switch is able to process the traffic already forwarded to the low-latency switch.

10. The computer program product as recited in claim 7, further comprising computer readable program code configured for processing the packet to determine at least one property of the packet, the at least one property of the packet comprises one or more of: a packet priority, a destination application identifier, a source address, a destination address, a packet size, a virtual local area network (VLAN) identifier, and an acceptable latency for the packet.

11. The computer program product as recited in claim 10, further comprising computer readable program code configured for using the at least one property of the packet to determine whether the packet satisfies the packet forwarding policy.

12. The computer program product as recited in claim 10, wherein the packet forwarding policy is a multi-stage policy which takes into account the at least one property of the packet and levels of congestion for downstream switches, the multi-stage policy categorizing packets and forwarding the packets to downstream switches based on the level of congestion of the downstream switches and the categorization of the packets.

13. A method for providing low latency packet forwarding with guaranteed delivery, the method comprising:
receiving a packet at an ingress port of a switch;
receiving congestion information at the switch from one or more low-latency downstream switches;
determining that at least one congestion condition is met based on at least the congestion information;

applying a packet forwarding policy to the packet in response to a determination that the at least one congestion condition is met, wherein the at least one property of the packet is used to determine whether the packet satisfies the packet forwarding policy;

forwarding the packet to a buffered switch in response to a determination that the packet satisfies the packet forwarding policy; and forwarding the packet to a low-latency switch in response to a determination that the at least one congestion condition is not met such that traffic is diverted from any low-latency downstream switch indicating congestion until the low-latency downstream switch is able to process the traffic already forwarded to the low-latency downstream switch.

14. The method as recited in claim 13, further comprising:
determining whether the packet forwarding policy indicates to drop the packet; and
dropping the packet in response to a determination that the packet forwarding policy indicates to drop the packet.

15. The method as recited in claim 13, wherein the at least one congestion condition comprises receipt of back pressure from one or more low-latency switches downstream of the switch, and further comprising diverting traffic from any low-latency switch indicating congestion until the low-latency switch is able to process the traffic already forwarded to the low-latency switch.

16. The method as recited in claim 13, further comprising processing the packet to determine at least one property of the packet, the at least one property of the packet comprises one or more of: a packet priority, a destination application identifier, a source address, a destination address, a packet size, a virtual local area network (VLAN) identifier, and an acceptable latency for the packet.

17. The method as recited in claim 16, further comprising using the at least one property of the packet to determine whether the packet satisfies the packet forwarding policy.

18. The method as recited in claim 16, wherein the packet forwarding policy is a multi-stage policy which takes into account the at least one property of the packet and levels of congestion for downstream switches, the multi-stage policy categorizing packets and forwarding the packets to downstream switches based on the level of congestion of the downstream switches and the categorization of the packets.

19. A method for providing low latency packet forwarding with guaranteed delivery, the method comprising:
receiving a packet at an ingress port of a switch;
receiving congestion information from one or more downstream low-latency switches;
determining that at least one congestion condition is met based on at least the congestion information;
processing the packet to determine at least one property of the packet;
applying a packet forwarding policy to the packet when the at least one congestion condition is met, wherein the at least one property of the packet is used to determine when the packet satisfies the packet forwarding policy;
forwarding the packet to a buffered switch when the packet satisfies the packet forwarding policy; and
forwarding the packet to a low-latency switch when the at least one congestion condition is not met such that traffic is diverted from any low-latency switch indicating congestion until the low-latency switch is able to process the traffic already forwarded to the low-latency switch.

20. The method as recited in claim 19, wherein the at least one property of the packet comprises one or more of: a packet priority, a destination application identifier, a source address, a destination address, a packet size, a virtual local area network (VLAN) identifier, and an acceptable latency for the packet.

21. The method as recited in claim 19, further comprising:
determining if the packet forwarding policy indicates to drop the packet; and
dropping the packet when the packet forwarding policy indicates to drop the packet.

22. The method as recited in claim 19, wherein the congestion information comprises at least one of: 802.1Qbb—Priority Based Flow Control (PFC), 802.1az—Enhanced Transmission Selection (ETS), Quantized Congestion Notification (QCN), and regular flow control according to IEEE 802.3X.

* * * * *